Dec. 2, 1930.  J. H. COX  1,783,281
VALVE
Filed Feb. 25, 1928
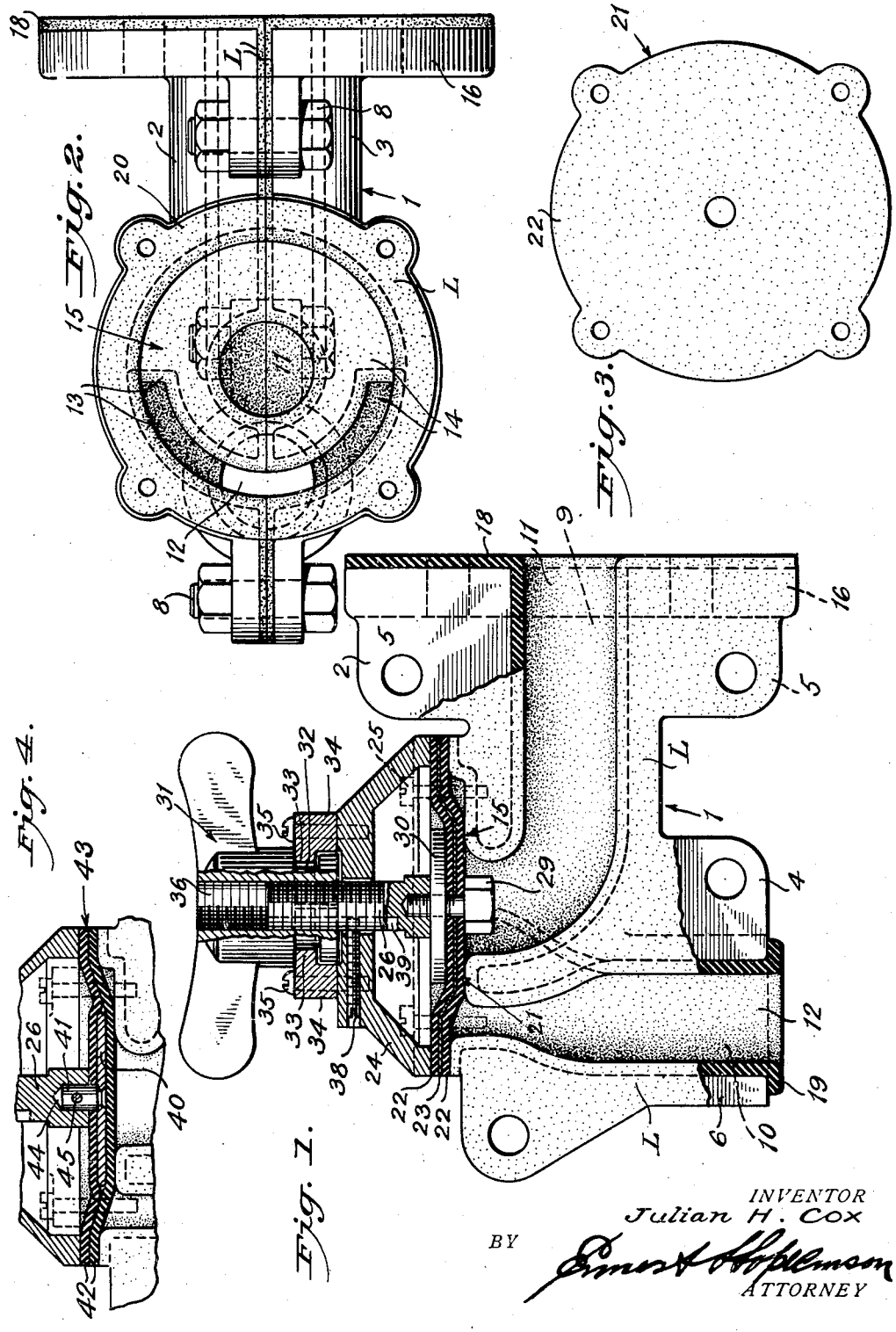
INVENTOR
Julian H. Cox
BY
ATTORNEY Patented Dec. 2, 1930

1,783,281

UNITED STATES PATENT OFFICE

JULIAN H. COX, OF NEWTON, MASSACHUSETTS, ASSIGNOR TO THE MECHANICAL RUBBER COMPANY, OF CLEVELAND, OHIO, A CORPORATION OF NEW JERSEY

VALVE

Application filed February 25, 1928. Serial No. 256,826.

This invention has particular reference to a metallic valve or bib-cock provided with a lining arranged to protect the interior from the destructive action of acids or other chemicals.

One of the objects of the invention is to simplify and expedite the application of a rubber lining and insure good workmanship. For this purpose the body of the valve is preferably made in two separable sections; that is, split lengthwise of the liquid passages and provided with abutting flanges for fastening the two sections together. By reason of this split construction, the liquid passages of the separated sections are presented in the form of open channels or depressions which are readily accessible for lining. Each section is preferably lined with vulcanizable rubber composition which may be pressed into the channels or depressions and arranged to extend over the flanges to form a gasket, the rubber being thereafter cured. In some instances the passages may be lined with hard rubber instead of soft. When the two sections are fastened together, the gaskets provide a liquid-tight seal.

Another object of the invention is to provide a valve incorporating simplicity and ruggedness and in which the valve operating mechanism is entirely protected from the chemicals. Other objects and advantages will appear as the description proceeds.

In the accompanying drawings forming a part of this specification:

Fig. 1 is a vertical sectional view of the valve with parts broken away;

Fig. 2 is a plan view with the valve controlling mechanism removed; and

Fig. 3 is a plan view of an elastic diaphragm, and

Fig. 4 is a fragmental section illustrating another form of diaphragm.

According to one embodiment of the invention the reference numeral 1 indicates generally a valve body preferably comprising two metallic sections or halves 2 and 3 equipped with abutting flanges or faces 4, 5 and 6 which may be fastened together by bolts 8 to hold the sections 2 and 3 together as a unit. Each of the sections 2 and 3 are formed with depressions as indicated at 9 and 10 which are adapted when the two sections are secured together to form a liquid entrance passage 11 and a discharge spout 12. Each of the sections 2 and 3 are also formed with recesses 13 and 14 shaped to provide communication between the passage 11 and the spout 12 and to form a valve seat designated generally 15. By splitting the valve into separable sections lengthwise of the liquid passages 11 and 12 and the valve seat 15, these parts of the valve are presented as depressions or channels which may be readily lined with protective material, such as rubber L for protecting the metallic walls from the liquid. The lining L may comprise a sheet of soft vulcanizable rubber applied to each section in a manner to cover the walls of the channel 11 and the discharge spout 12 and also the valve seat 15. This lining may be applied in a number of different ways, one of which is to apply a suitable cement to the walls of the depressions 11, 12, 13, and 14 and the flanges 4, 5 and 6 and then press the vulcanizable sheet rubber into position within the depressions and into contact with all the flanges, after which the rubber is cured. Also, the sections 2 and 3 may be lined with hard rubber composition instead of soft, and in either case the sections may be used as molds for curing the lining. Other methods of lining the sections 2 and 3 may be employed. After lining the two sections 2 and 3, they are placed together with the flanges 4, 5 and 6 in abutting relation and the bolts 8 are drawn up to clamp the two sections together, thereby causing the overlying or flanged portions of the rubber linings L to be pressed tightly together, thus forming a liquid-tight seal between the sections and placing the lined valve seat recesses 13 and 14 and the channels 9 and 10 in registration to form the complete valve seat 15 and the liquid conveying passages 11 and 12. For attaching the valve to a container, there may be provided an enlarged flange 16.

The rubber lining L is preferably formed with an overlying portion 18 on the outer face of the flange 16 so as to provide a gasket between the latter and the receptacle, and the spout portion of the lining L may be turned over adjacent the mouth, as indicated at 19 so as to prevent acid from dripping directly on to the adjacent parts of the valve sections 2 and 3, as will readily be understood.

The valve seat 15 is preferably circular in form and slightly sunk below the level of an annular flange 20 of the body 1, upon which rests a circular diaphragm valve 21 or stop preferably of rubber composition or other suitable acid resisting material. This diaphragm may be laminated as illustrated in Fig. 1, comprising two layers of rubber 22 with or without an interposed layer of fabric 23. The diaphragm 21 is adapted to be actuated in a manner to press the lower face thereof against the seat 15 to stop the flow of liquid through the valve passages, and is secured in position on the body 1 by means of a housing 24, which clamps the outer edges of the diaphragm 21 to the body 1, through the medium of screws 25. It will be seen that by raising the diaphragm from the seat 15, that the liquid has access from the entrance passage 11, over the valve seat 15, through the recesses 13 and 14, and then down through the discharge spout 12. For effecting operation of the diaphragm 21 to control the liquid flow, there is provided a threaded stud 26 the lower end of which is secured to the center of the diaphragm 21 by an acid proof cap screw. A washer or disc 30 preferably interposes the stud 26 and the diaphragm 21, whereby to provide a backing for the latter.

For elevating or lowering the stud 26 to effect opening or closing of the diaphragm valve 21 there is provided wing-nut 31 having a circular groove 32 into which the semi-circular shoulder portions 33 of a pair of retaining members 34 extend, the latter being preferably secured to the top of the housing 24 by means of screws 35. The wing-nut 31 has a vertical bore 36 into which the stud 26 is loosely threaded. Rotation of the wing-nut 31 about its vertical axis, causes raising or lowering of the threaded stud 26, to operate the valve 21. In order to obviate any turning tendency of the stud 26 during rotation of the wing-nut 31, there may be provided a guide-pin 38 threaded into the housing 24 and arranged to extend into a vertical spline 39 of the stud 26. It will be seen further that the diaphragm valve 21 forms a protecting shield between the liquid passages 11 and 12 and the entire valve operating mechanism, including the housing, so that at no time is it possible for any of the operating mechanism to be reached by the liquid contents of the valve. This adds materially to the life of the valve and insures proper working thereof at all times.

Furthermore, the valve body may be made in more than two sections, if found desirable, each one of the sections being separately lined with a suitable rubber composition and then all of the sections fastened together to form the complete valve body and liquid passages.

In Fig. 4 there is illustrated another form of diaphragm, which is especially suitable for valves of the larger sizes and also may be substituted for the construction already described. The acid proof screw 29 is dispensed with and there is provided a stiffening plate 40 to which there is fastened, as by riveting, a stud 41. The plate 40 is entirely encased preferably between two layers of rubber 42 forming a diaphragm 43, whereby to obtain the advantages of both mechanical strength and protection from the liquid, and stud 41 projects through the top layer into a socket 44 at the lower end of the threaded stud 26 where it may be secured by a pin 45.

It is to be understood that the herein described embodiment is merely illustrative and not limitative, since it is manifest that the invention may be incorporated in other similar structure without departing from the spirit of the invention as defined in the appended claims.

Having thus described my invention, what I claim and desire to protect by Letters Patent is:

1. A valve including a body divisible into sections along opposed faces at the sides of a fluid passage, each section being provided with an individual lining adapted to protect the passage portion thereof and extend between the opposed faces at the sides of the passage portions to form seals.

2. A valve including a body divisible into sections along opposed faces at the sides of a fluid passage and a seat, each section being provided with an individual lining adapted to protect the passage and the seat portions and also being arranged to line the opposing faces, whereby the face linings may be pressed together between the opposing faces of the sections to form seals.

3. A valve including a body divisible into sections along opposed faces at the sides of a valve-seat, each section including protective material arranged to line the associated passages and the valve-seat portions, said material also being interposed between the opposed faces to form a seal, a stop comprising protective material coacting with said valve-seat to control the liquid flow, and means for operating the stop, said stop also providing a protecting shield between the conveyed liquid and said operating means.

4. A valve including a body having a liquid passage and a valve-seat, said body being divided into sections lengthwise through the passage and the valve-seat, protective material arranged to line the passage and valve-seat portions of each section and provide a gasket, means for securing said sections together with the gaskets pressed against each other, and a diaphragm of protective material adapted to cooperate with said valve-seat to open or close said liquid passage.

5. A valve including a body having a liquid passage and a valve-seat, said body being divided into sections lengthwise through the passage and the valve-seat, rubber composition arranged to line the passage and valve-seat portions of each section and provide a gasket means for securing said sections together with the gaskets, pressed against each other, and a rubber diaphragm adapted to cooperate with said valve-seat to open or close said liquid passage.

6. A valve including a body having a liquid passage and a valve-seat, said body being split in halves lengthwise through the liquid passage and the valve-seat so as to present two separable complemental sections having open channels and abutting surfaces at the line of division, rubber composition arranged to line the walls of the liquid passages, the valve-seat and the abutting surfaces, means for securing the sections together with the abutting linings pressed together, and a rubber diaphragm valve adapted to coact with said valve-seat to control the liquid.

7. A valve including a body having a liquid passage and a valve-seat, said body being split into two sections lengthwise through said liquid passage and the valve-seat, each section including flanges extending from opposite sides of the adjacent passage portions, rubber composition arranged to line the passage and valve-seat portions and cover the flanges, and means for connecting said sections together in a manner to press the covered parts of the flanges together and form the complete liquid passage, and valve-seat, a diaphragm valve of rubber composition coacting with said valve-seat to control the liquid, and means for operating said diaphragm valve, said diaphragm being arranged to protect said valve operating means from the conveyed liquid.

8. A valve including a body having a liquid passage and a valve-seat, said body being divided into a plurality of sections lengthwise of said passage and the valve-seat, means for securing said sections together, each of said sections carrying a rubber lining arranged to protect the associated passage walls and valve-seat portions, the linings being also arranged to form a seal between the joined sections, a rubber diaphragm valve adapted to coact with said valve-seat to control the liquid, a housing member arranged to hold the diaphragm in working position, and valve operating mechanism carried by said housing, said diaphragm providing a shield between its operating means and the conveyed liquid.

9. A valve including a body having a liquid passage and a valve-seat, said body being divided into a plurality of sections lengthwise of said passage and the valve seat, means for securing said sections together, each of said sections carrying a rubber lining arranged to protect the associated passage walls and valve-seat portions, the linings being also arranged to form a seal between the joined sections, a rubber diaphragm valve adapted to coact with said valve seat to control the liquid, a housing member arranged to house said valve and hold the same in working position, and valve operating mechanism including an element rotatably mounted in said housing, said element having a threaded bore through its axis of rotation, a stud threaded into said bore and operatively connected to said diaphragm and a handle for rotating said element.

Signed at Chelsea, county of Suffolk, State of Massachusetts, this 21st day of February, 1928.

JULIAN H. COX.